US008212818B2

(12) United States Patent
Hart, II et al.

(10) Patent No.: US 8,212,818 B2
(45) Date of Patent: Jul. 3, 2012

(54) WINDOWLESS SHAPE DRAWING

(75) Inventors: John W. Hart, II, Bellevue, WA (US); John Z. Chen, Woodinville, WA (US); Taosheng Hu, Shanghai (CN); Scott Tucker, Kirkland, WA (US); Wenhui Zhu, Shanghai (CN); Chen Ji, Shanghai (CN); Steven Michael Hoag, Snohomish, WA (US); Paul Yuknewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 12/188,798

(22) Filed: Aug. 8, 2008

(65) Prior Publication Data

US 2010/0033504 A1 Feb. 11, 2010

(51) Int. Cl.
*G06T 11/20* (2006.01)

(52) U.S. Cl. ........ 345/441; 345/594; 345/619; 345/629; 345/660; 345/442; 345/443; 715/762; 715/763

(58) Field of Classification Search .......... 345/441–443, 345/594, 619, 629, 650, 660; 715/762, 763, 715/802, 806, 807
See application file for complete search history.

(56) References Cited

U.S. PATENT DOCUMENTS

| 5,784,057 | A  | * | 7/1998  | Alimpich et al. | 715/781 |
|-----------|----|---|---------|-----------------|---------|
| 6,512,519 | B1 | * | 1/2003  | Arsenault et al. | 345/441 |
| 6,701,513 | B1 | * | 3/2004  | Bailey          | 717/109 |
| 6,734,873 | B1 | * | 5/2004  | Herf et al.     | 345/629 |
| 6,957,391 | B2 | * | 10/2005 | Broussard       | 715/746 |
| 7,320,120 | B2 |   | 1/2008  | Rajarajan et al. |         |
| 7,624,356 | B1 | * | 11/2009 | Rockey et al.   | 715/811 |
| 7,661,088 | B2 | * | 2/2010  | Burke           | 717/105 |
| 2005/0088454 | A1 | * | 4/2005 | Lin             | 345/589 |
| 2006/0101396 | A1 |   | 5/2006 | Burke           |         |
| 2006/0150148 | A1 |   | 7/2006 | Beckett et al.  |         |
| 2007/0100967 | A1 |   | 5/2007 | Smith et al.    |         |
| 2007/0265827 | A1 |   | 11/2007 | Wall et al.    |         |

OTHER PUBLICATIONS

Using ActiveX Controls with Windows Forms in Visual Studio .Net http://msdn.microsoft.com/en-us/library/ms973200.aspx.
Programming VB.NET: A Guide for Experienced Programmers http://www.rubicondata.dk/artikelsamling/old_artikler/Programmering/ProgrammingVBDotNet.pdf.
Mastering Visual Basic .Net ftp://ftp.sybex.com/2877/2877ch05.PDF.

* cited by examiner

*Primary Examiner* — Xiao M. Wu
*Assistant Examiner* — Todd Buttram
(74) *Attorney, Agent, or Firm* — Microsoft Corporation

(57) ABSTRACT

Development environments are commonly used to facilitate the development of user interfaces (e.g. windows forms, web forms, etc.). Drawing objects are components that may be used within the development environment to provide visual enhancements to the user interface. An effective method for drawing one or more drawing objects is disclosed herein to draw the drawing objects as windowless shapes within a shape container. The shape container may be configured to participate in a windows message loop (e.g. event handling system), wherein the windowless shapes do not participate in the windows message loop (e.g. lack a windows handle). The shape container listens, for example, within the windows message loop for operations pertaining to windowless shapes, and executes the operations upon the windowless shapes. Computer resources may be efficiently allocated, for example to the graphical user interface during runtime, instead of the windowless shapes consuming resources to participate in the windows message loop.

20 Claims, 9 Drawing Sheets

WINDOWLESS SHAPE DRAWING

BACKGROUND

Development environments are commonly used to facilitate the creation of graphical user interfaces (e.g. webpage, windows application, etc.). For example, these development environments allow developers to implement such things as drawing objects (e.g., lines or shapes, images, etc.) into a graphical user interface without having to write complex code to access drawing API's (e.g., System Drawing assembly). While the graphical user interface is operational, the implementations listen for operations (consuming valuable computer resources) associated with them from a computing environment (e.g., participating in a windows message loop). For example, a user may select a drawing object in the graphical user interface, and the drawing object may detect (by listening) a command to change colors.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a technique for drawing a set of drawing objects in a graphical region is presented. During design time, a drawing object to be placed onto a form (e.g., visual template, panel, etc) is received. In one example, the drawing object is received when the developer drags and drops the drawing object onto the form from a toolbox. A determination may be made as to whether the form already comprises a shape container. If the form does not comprise a shape container, then a shape container is created. Upon receiving the drawing object to be placed onto the form, the drawing object is drawn in a shape container within the form as at least one windowless shape.

The shape container may comprise an area within the design environment that fills the entire form as well as an area less than the area of the entire form. In one embodiment the shape container is dock filled to fill the entire area of a form (e.g. the coordinates of the shape container match the coordinates of the form). In another embodiment the shape container may fill a graphical region of the form that is smaller than the form (e.g. the shape container comprises an area that is half the area of the entire form).

A windowless shape may be manipulated by a user within the design environment. Windowless shapes may be resized, repositioned, removed, redefined properties, and/or any other manipulation. If the shape container is not dock filled (e.g. the shape container comprises an area less than the entire form), then the shape container may be reoriented in response to a manipulation by a user. The shape container may reorient the size and position to encompass the graphical region comprising the windowless shapes after the manipulation is performed. If a manipulation removes a last windowless shape within the form, then the shape container may be removed from the form.

When an operation pertaining to at least one windowless shape is received (e.g. which may occur during runtime of the graphical user interface), the shape container is invoked to execute the operation on at least one windowless shape. An operation may comprise, but is not limited to: instantiating, initializing, enumerating, drawing, describing, and/or altering the windowless shape. For example, when a graphical user interface first enters a runtime state (e.g. is executed), the computing environment may generate an operation instructing a drawing object to visually draw itself onto the graphical user interface. A windows message loop, for example, may be responsible for transporting the operation to through the computing environment. The shape container may participate in the windows message loop (e.g. listen for events, operations, messages, etc.), while the windowless shapes do not participate in the windows message loop (e.g. the windowless shapes do not have a windows handle).

If the shape container receives (e.g. identifies within the windows message loop a message pertaining to a windowless shape comprised within the shape container) an operation pertaining to at least one windowless shape, the shape container may relay the operation to the appropriate windowless shape, instruct the windowless shape to perform the operation, and/or perform the operation upon the windowless shape.

A graphical user interface may comprise one shape container that includes a large number of drawing objects that would otherwise consume resources listening to the windows message loop for messages pertaining to them. Computing resources used by a graphical user interface during runtime may be mitigated (e.g. efficiently reallocated) since the shape container participates in the windows message loop (instead of drawing object). In one example, the computer resources may be reallocated to the graphical user interface, instead of the windowless shapes, to provide an efficient and enriched experience to a user interacting with the graphical user interface during runtime.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
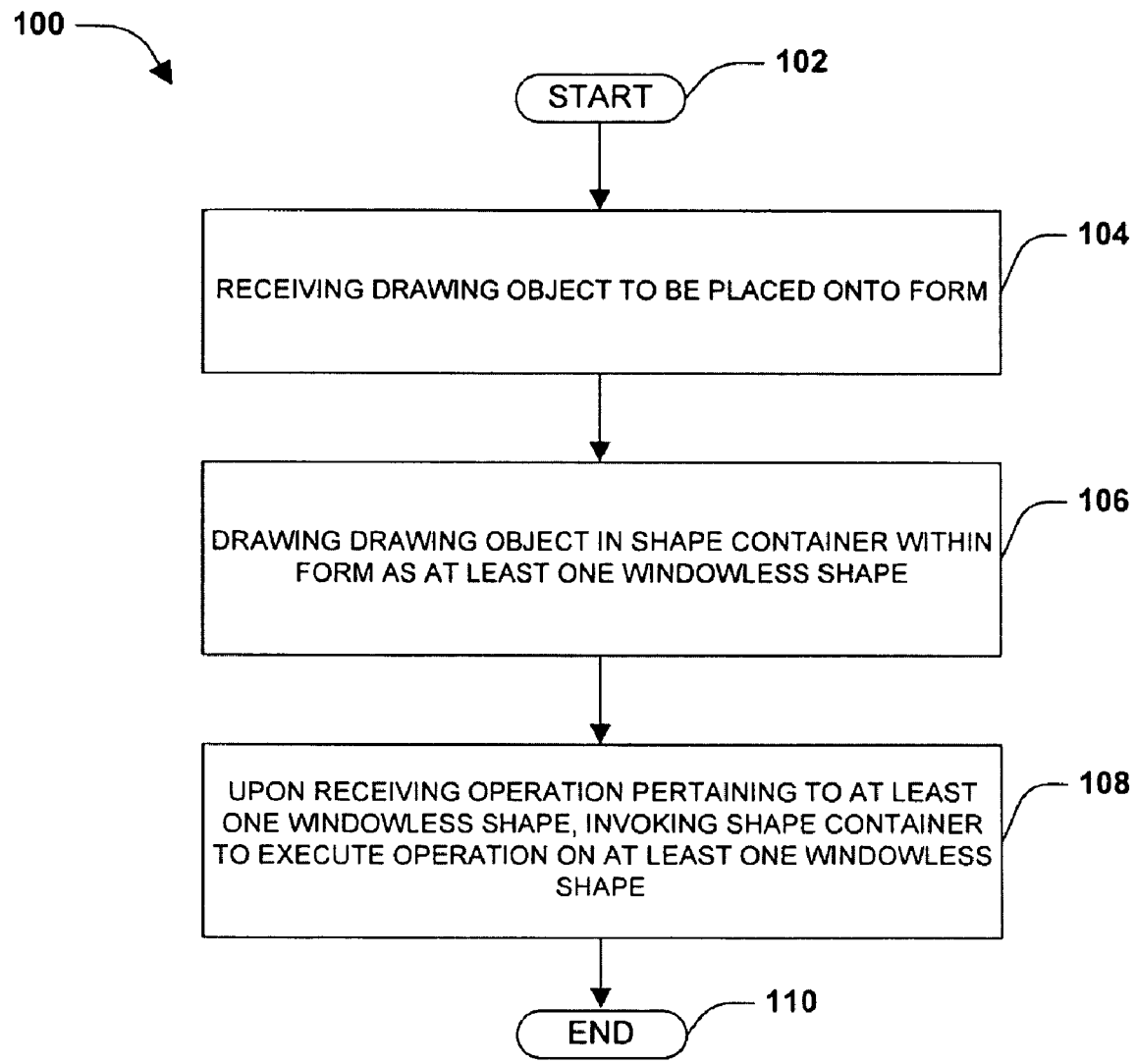
FIG. 1 is a flow chart illustrating an exemplary method of drawing a set of drawing objects in a graphical region.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A development environment (e.g. IDE) may be Used to facilitate the creation of a graphical user interface (e.g. webpage, windows application, etc.) by providing a form, a set of tools, and/or any other functionality to a developer. One tool, which may be used within the development environment, comprises a set of drawing objects (e.g. lines, shapes, etc.). It will be appreciated that the terms "drawing object" are used in a broad sense herein to describe or comprise, among other things, a line, shape, or image that may be inserted into a graphical user interface (e.g., webpage, windows application, etc.) and manipulated as a function of some event (e.g., user input, operations, system messages, etc.). Drawing objects, along with other controls (e.g., buttons, tables, HTML controls, etc.), may be placed onto the form and manipulated (e.g. change properties, resized, repositioned, etc.) within the development environment during design time. This allows a developer to visually design the graphical user interface within the form. The form may be executed during runtime, allowing a user to interact with the form.

A form is not limited to a visual template for a graphical user interface. A form may be interpreted as a panel, container control, user control, visual template for a graphical user interface, and/or any other structure within a development environment that may facilitate drawing objects and/or windowless controls. A graphical user interface may comprise one or more forms and/or the graphical user interface may be a form during runtime.

Windowless controls are components that do not participate directly (e.g. lack a windows handle) in a windows message loop (e.g. event system). Windowless controls mitigate performance issues of runtime (e.g. form during runtime) because the windowless controls do not consume computing resources for participating in the windows message loop. Some runtimes (e.g. WinForms, etc.) and/or design environments do not natively support windowless controls.

There are several known issues within the art, wherein improvements, such as those disclosed herein, may be made. During design time, a design environment may provide limited drawing object functionality. A developer may have to write complex code (e.g. through a programming language) to access drawing APIs (e.g. System Drawing assembly, etc.) that provide limited runtime drawing object instructions. The developer may not have the ability to visually drag and drop drawing objects onto a form and/or manipulate (e.g. resize, reposition, etc.) drawing objects within the design environment. Instead, the developer may have to write extensive code to create the drawing objects and/or provide functionality for the drawing objects. A developer may not receive visual feedback of the drawing object and/or functionality, because the code does not execute until runtime (the drawing object will be visually drawn for the first time at runtime).

During runtime, components (a graphical user interface, a form, drawing object, and/or controls) may listen for (e.g. participate in a windows message loop) and respond (e.g. through a windows handle) to operations. An operation may comprise instructions corresponding to a user input (e.g. mouse click, key stroke, etc.), a system message (e.g. instantiate command, initialize command, draw command, etc.), and/or any appropriate event or message. A component (graphical user interface, form, and/or control) may receive operations by listening to a windows message loop. The windows message loop may comprise a list of operations (e.g. a data structure in memory, a stack, etc.) that components listen for and receive. The components may comprise a windows handle (e.g. functionality) that may listen for operations within the windows message loop, receive the operations pertaining to the component, and/or perform the operation.

Performance of a computing system, for example, becomes an issue as more components are added to a runtime because more computing resources are consumed as more components participate in the windows message loop during runtime. Thus, components consume computing resources that a runtime environment (e.g. a form in runtime) could have used to provide an efficient and enriched runtime experience, for example.

Techniques disclosed herein, may be used to enhance drawing object functionality during design time and mitigate performance issues during runtime. In one method, drawing objects are drawn as windowless shapes within a shape container. It will be appreciated that the terms "shape container" is used in a broad sense herein to describe or comprise, among other things a panel, such that one or more drawing objects may be drawn in the panel, wherein the drawing object(s) and a computing environment maybe in operative communication with the panel. Stated in a different manner, the windowless shapes drawn within the shape container may not participate in the windows message loop. Instead, the shape container may participate in the windows message loop and receive operations pertaining to the windowless shapes comprised therein. It will be appreciated that a plurality of drawing objects may be drawn in a shape contain and/or multiple shape containers may be comprised within a form.

Within a design environment, a developer may access drawing objects from a toolbox, wherein the drawing objects may be placed onto a form and/or manipulated within the form. The form receives a drawing object placed on it, and a determination may be made as to whether the form already comprises a shape container. If the form does not comprise a shape container, then a shape container is created. The drawing object is then drawn within the shape container as a windowless shape. It will be appreciated that a developer may have the ability to manipulate the windowless shape within the form. This technique, for example, allows a developer to visually design drawing objects on a form during design time, instead of writing complex code, for example, to create the drawing objects during runtime.

During runtime, the shape container listens to a windows message loop (e.g. an event system), for example, for operations pertaining to windowless shapes comprised within the shape container. Upon the shape container receiving an operation from the windows message loop, the shape container may perform the operation upon a windowless shape, instruct the windowless shape to perform the operation, and/ or relay the operation to the windowless shape to handle. One embodiment of drawing a set of drawing objects in a graphical region is illustrated by exemplary method 100 in FIG. 1. At 102, the method begins. At 104, a drawing object to be placed onto a form is received. The form (e.g. visual template of a graphical user interface, user control, panel, container control) may be comprised within a design environment (e.g. IDE). The design environment may further comprise a set of (predetermined) drawing objects (e.g. lines, shapes, images, etc.). A developer may drag and drop a drawing object onto a graphical region of the form (e.g. designating that the drawing object is to be placed onto the form).

A determination may be made as to whether the form already comprises a shape container. If the form does not comprise a shape container, then a shape container is created. At 106, the drawing object is drawn in the shape container within the form as at least one windowless shape. The shape container may be configured to draw the windowless shape on the form during design time and/or runtime. The shape container may be presented visually as invisible and/or visible within the form during runtime and/or design time. The location (e.g. coordinates) of the shape container may be formed at the bottom of a z-axis ordering list, for example. Forming the shape container at the bottom of the z-axis ordering list, for example, allows other added controls to be drawn on top of the shape container.

The shape container may be configured to respond to manipulations (e.g. operations) pertaining to windowless shapes during design time. For example, the shape container may receive a manipulation command for a windowless shape (e.g. resize, reposition, alter the properties, etc.) within the shape container from a developer. Upon receiving the manipulation, the shape container may execute the manipulation command upon the corresponding windowless shape. This may give the developer the ability to manipulate windowless objects in a visual and interactive manner, for example, rather than writing complex calls to drawing APIs during runtime to create and manipulate the drawing object (windowless shape).

At 108, upon receiving an operation pertaining to at least one windowless shape, the shape container is invoked to execute the operation on at least one windowless shape. During runtime, the shape container participates in a windows message loop (e.g. event system, a stack of operations within memory, etc.) by listening for operations that pertain to the windowless shapes comprised within the shape container. The shape container may perform the instruction on the windowless shape, instruct the windowless shape to perform the operation, and/or relay the operation to the windowless shape to handle.

Figure 2:
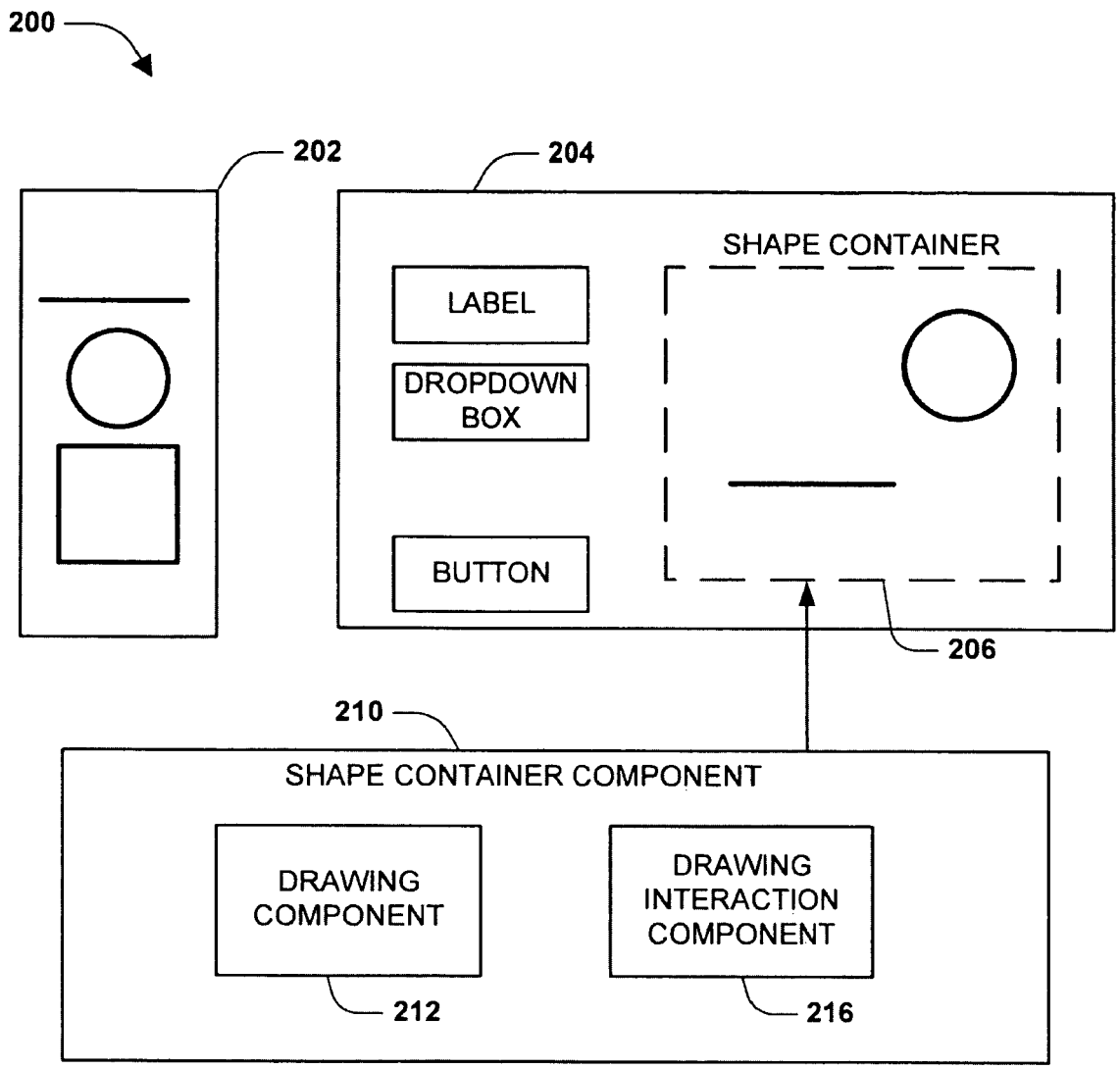
FIG. 2 is a component block diagram illustrating an exemplary system for drawing a set of drawing objects in a graphical region.
Figure 2:
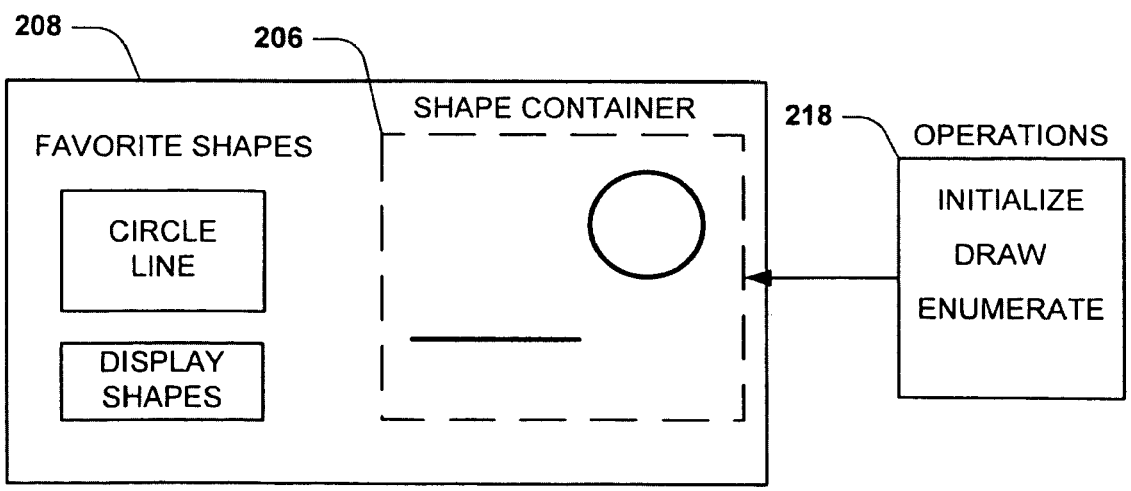

FIG. 2. illustrates an example of a system 200 configured to draw a set of drawing objects in a graphical region (used by a developer to design a graphical user interface). The system 200 comprises a form 204 at design time, a form 208 at runtime, a set of drawing objects 202, and a shape container component 210. The set of drawing objects 202 may comprise lines and/or shapes that a developer can drag and drop, for example, onto the form 204 during design time. It will be appreciated that the drawing objects may become windowless once placed onto the form. The form 204 may comprise controls (a label, a dropdown box, a button, etc.) and a shape container 206. The shape container 206 may comprise windowless shapes (a line and a circle). It may be appreciated that a shape container may be dock filled. A dock filled shape container fills the entire area of the form. The shape container may be dock filled by default. The shape container that is not dock filled may be created and/or resized to an area less than the entire form (e.g. a graphical region surrounding the windowless shapes).

The shape container component 210 comprises a drawing component 212 and a drawing interaction component 216. The shape container component 210 is configured to create the shape container 206 within the form 204 in response to a user placing a drawing object onto the form 204. The shape container component 210 may make a determination whether the form 204 comprises a shape container when a drawing object is received (is to be placed on the form). If the form 204 does not comprise a shape container, then the shape container component 210 creates a shape container. It will be appreciated that if the form already comprises a first shape container, the shape container component may create a second shape container and/or locate the first shape container. Once a shape container is created and/or located (e.g. already exists within the form), then the drawing object is drawn within the shape container as a windowless shape. The shape container component 210 may be further configured to remove the shape container 206 from the form 204 when a last windowless shape is removed by a user, wherein the last windowless shape to be removed is the last windowless shape within the form 204 and/or the shape container 206.

The drawing component 212 (comprised within the shape container component 210) is configured to draw one or more windowless shapes within the shape container 206 onto the form (204 and/or 208) during design time and/or runtime. During design time, the drawing component 212 is configured to provide a developer the ability to visually draw and/or manipulate (e.g. invoke an operation upon a windowless shape, resize, reposition, etc.) windowless shapes within the form 204. During runtime, the drawing component is configured to visually draw the windowless shapes within the shape container 206 onto the form 208. The functionality of the drawing component 212 mitigates the need for developers to write complex calls (to draw the windowless shapes within the form 208) to drawing API's during runtime.

The drawing interaction component 216 is configured to receive a manipulation request and/or apply the manipulation request to one or more windowless shapes within the shape container 206. The drawing interaction component 216 may be configured to receive manipulation requests by a developer during design time. This may, for example, provide the developer with an enhanced environment for visually and interactively creating and/or manipulating windowless shapes within the design environment.

During runtime, the shape container 206 is configured to receive operations 218 pertaining to windowless shapes within the shape container 206 of the form 208. It will be appreciated that form 208 is form 206 in a runtime environment. The shape container 206 may receive operations 218 from a windows message loop (e.g. an event system, instruction stack, function call, etc.), for example. The shape container 206 may be configured to listen to the windows message loop for operations 218 and/or be told operations 218 that pertain to the windowless shapes. An operation 218 may be, but is not limited to: instantiating, initializing, enumerating, describing, drawing, alter, deinitializing, and/or disposing the windowless shape within the form 208. The operation may be created based upon user input, a system instruction, and/or any other event.

The number of windowless shapes comprised within the shape container 206 in form 208 may not affect the computing resources used by the form 208 during runtime based upon participation in the windows message loop, for example. The shape container 206 is configured to participate in the windows message loop and not the windowless shapes, regardless of the number of windowless shapes within the shape container 206 in the form 208.

The shape container 206 is configured to an execute operation for the windowless shape(s) (e.g., instead of the windowless shapes listening for the operation 218). The shape container 206 may execute an operation by: relaying the operation 218 to the corresponding windowless shape, instructing the corresponding windowless shape to perform the operation 218, and/or perform the operation 218 upon the corresponding windowless shape. The windowless shape do not comprise a windows handle and, therefore, the windowless shape does not participate within the windows message loop.

Figure 3:
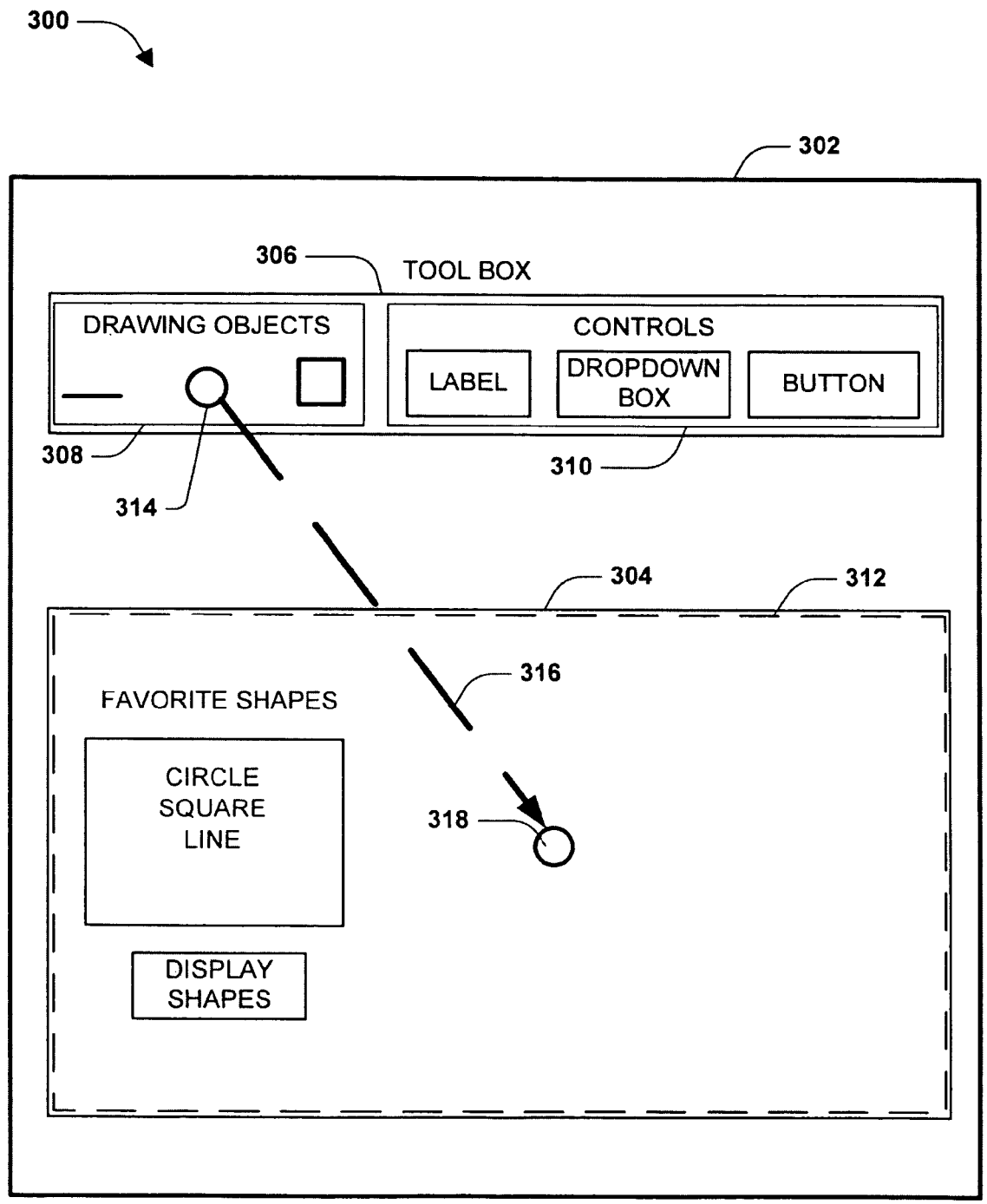
FIG. 3 is an illustration of an example of drawing a set of drawing objects in a graphical region during design time.

FIG. 3 illustrates an example 300 of drawing a set of drawing objects in a graphical region during design time. A design time environment 302 comprises a tool box 306. The tool box 306 comprises a set of drawing objects 308 and a set of controls 310. The design time environment 302 further comprises a form 304 (e.g. visual template for a graphical user interface, panel, user control, etc.). A developer may drag and drop, for example, drawing objects and/or controls onto the form 304 from the toolbox 306. Drawing objects and/or controls may have properties (e.g. font, size, text; response to operations, etc.) that the developer may manipulate. It will be appreciated that, once drawing objects (drawn as windowless shapes) and/or controls are placed on the form 304, the developer may further manipulate (e.g. resize, reposition, alter properties, etc.) the drawing objects (drawn as windowless shapes) and/or controls.

Example 300 illustrates a placement 316 of a circle drawing object 314 from the set of drawing objects 308 onto the form 304 within the design time environment 302. When a developer invokes the placement 316 (e.g. drags and drops the circle drawing object 314 onto the form 304), a determination is made as to whether a shape container is comprised within the form 304. If the form 304 does not comprise a shape container, then a new shape container 312 is created. The new shape container 312 fills the graphical region of the form 204 and encompassing the circle drawing object 314. The new shape container 312 is dock filled (e.g., fills the entire graphical region of the form 304). Otherwise, an existing shape container may be used to encompass the circle drawing object 314.

Once the determination is made and the new shape container 312 is created, the circle drawing object 314 is drawn within the new shape container 312 as a circle windowless shape 318. The circle windowless shape 318 may be configured to communicate with the shape container (and not comprise a windows handle and/or any other functionality used during runtime that may use computing resources).

The new shape container 312 fills the graphical region of the form 304 and surrounds the circle windowless shape 318. The new shape container 312 is presented as invisible within the form 304. The new shape container 312 is configured to receive operations pertaining to the circle windowless shape 318. Upon receiving an operation (e.g. from the windows message loop, user manipulation input, etc.), the new shape container 312 is configured to relay the operation to the circle windowless shape 318, instruct the circle windowless shape 318 to perform the operation, and/or perform the operation upon the circle windowless shape 318 during runtime.

Figure 4:
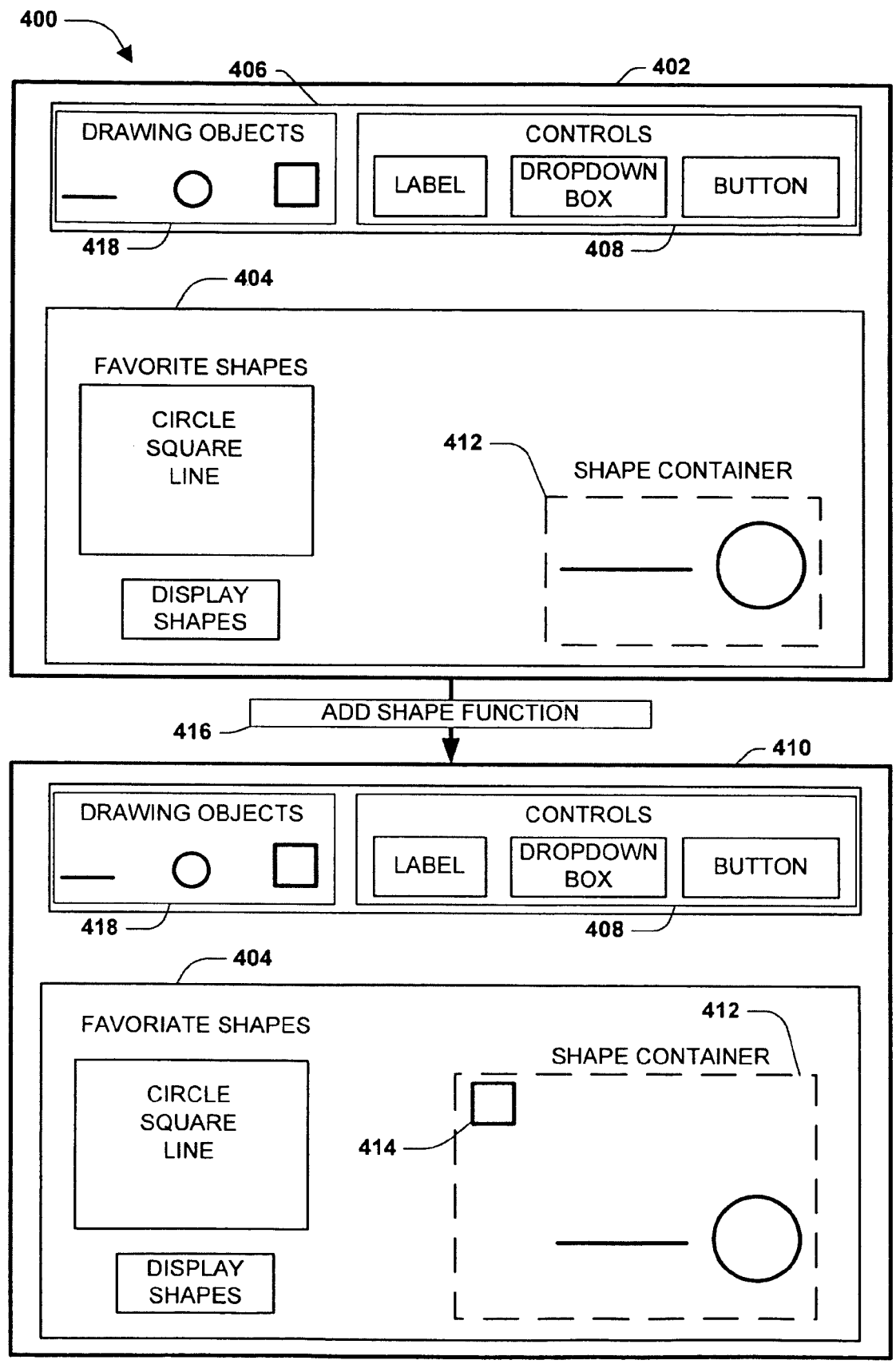
FIG. 4 is an illustration of an example of drawing a set of drawing objects in a graphical region during design time.

FIG. 4 illustrates an example 400 of drawing a set of drawing objects in a graphical region during design time. More particularly, example 400 illustrates a design time environment 402 before a drawing object (a square) has been added to a form 404 and a design time environment 410 (e.g., design time environment 402) after a drawing object (a square) has been added to the form 404. Besides the form 404, the design time environment 402 comprises a tool box 406. The tool box 406 comprises a set of drawing objects 418 and a set of controls 408.

The form 404 comprises a shape container 412. The shape container 412 in example 400 is not dock filled. The shape container 412 fills a graphical region less than the entire size of the form 404. It may be appreciated that the shape container 412 may be dock filled and fill the entire graphical region of the form 404. The shape container 412 comprises previously drawn drawing objects (e.g., a line windowless shape and a circle windowless shape). An add shape function 416 is invoked (e.g. a developer drags and drops a drawing object onto the form). The add shape function 416 comprises adding a drawing object (e.g., a square) onto the form 404. A determination is made as to whether the form 404 comprises a shape container. Because the form 404 already comprises the shape container 412, an additional shape container is not created. The shape container 412 is oriented to a size, shape, and position that encompass the graphical region where the square drawing object is to be placed. The orientation may be performed in response to developer input and/or an automatic response, for example. If the shape container 412 is dock filled, then an orientation may not be performed.

The square drawing object is drawn as a square windowless shape 414 within the shape container 412, as illustrated in design environment 410. The shape container 412 is configured to listen for (e.g. participate in the windows message loop during runtime) and invoke operations pertaining to the square windowless shape 414. The square windowless shape 414 is configured without a windows handle (e.g. does not participate in the windows message loop). The shape container 412 is presented within the form 404 and the form 410 as invisible.

Figure 5:
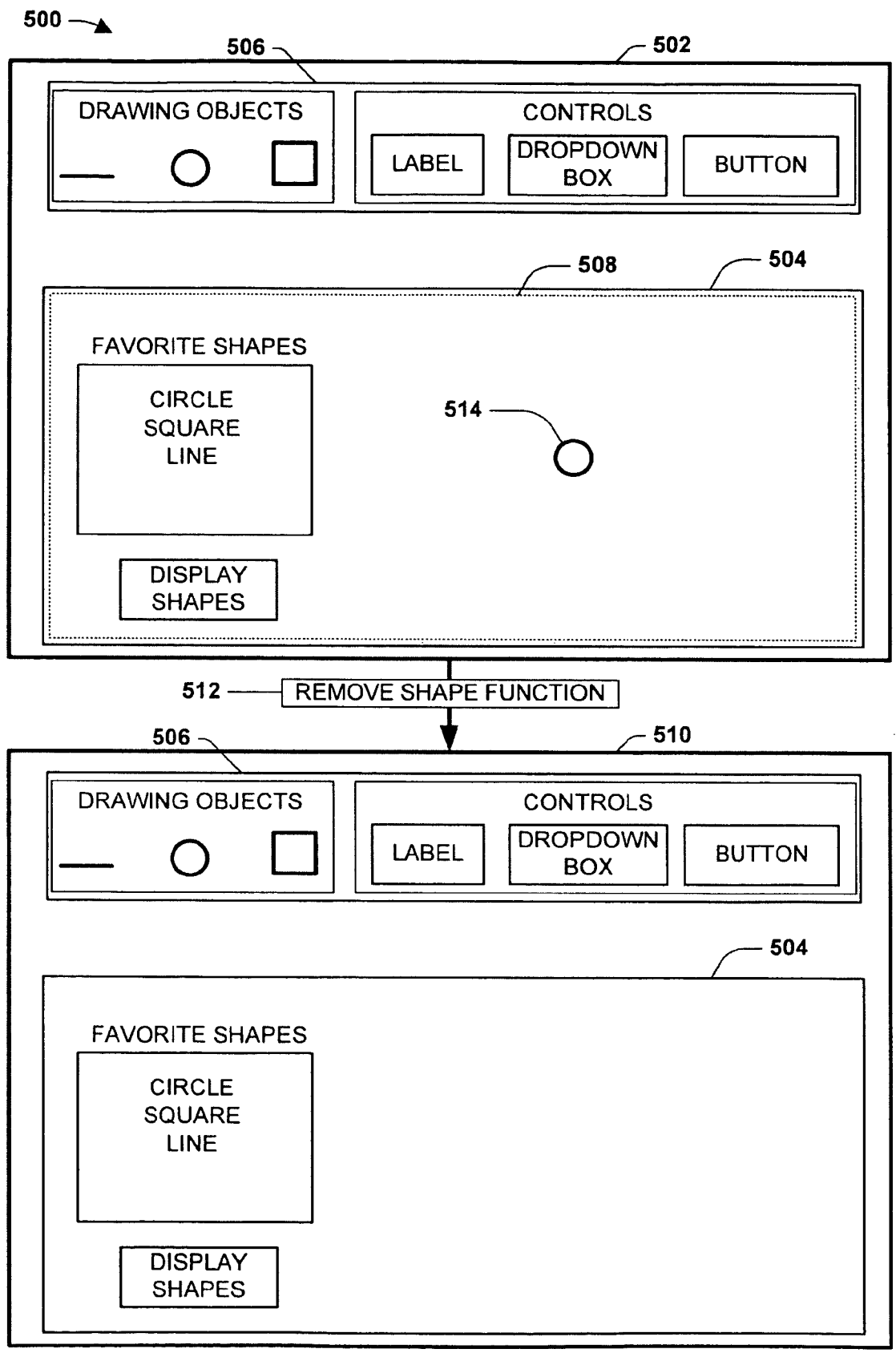
FIG. 5 is an illustration of an example of drawing a set of drawing objects in a graphical region during design time.

FIG. 5 illustrates an example 500 of drawing a set of drawing objects in a graphical region during design time. More particularly, example 500 illustrates a design time environment 502 before removing a drawing object (a circle) from a form 504 and a design time environment 510 (e.g., design time environment 502) after a drawing object (a circle) has been removed from the form 504. The design time environment 502 comprises a tool box 506. The tool box 506 comprises a set of drawing objects and a set of controls.

The form 504 comprises controls (e.g. label, list box, button, etc.) that may respond to events during runtime (e.g. configured to have a windows handle and configured to listen to a windows message loop). The form 504 further comprises a circle windowless shape 514 and a shape container 508. The shape container 508 is dock filled. The shape container 508 may be configured to listen to, participate in, respond to, etc. a windows message loop. The circle windowless shape 514 is configured without a windows handle and/or configured not to listen to a windows message loop.

A remove shape function 512 is invoked (e.g. a developer selects an object and deletes the selected object). The remove shape function 512 comprises removing the circle windowless shape 514 from the form 504, as illustrated in design environment 510. After the circle windowless shape 514 is removed, a determination is made as to whether the shape container 508 comprise at least one windowless shape. Because there are no windowless shapes within the shape container 508, the shape container 508 is removed from the form 504, as illustrated in design environment 510. The shape container is removed because it no longer provides useful functionality (e.g. the shape container may not participate in the windows message loop when there are no windowless shapes to listen on behalf of). In a second example, if the form 504 comprised a windowless shape after the circle windowless shape 514 was removed, then the shape container 508 would not be removed from the form 504.

Figure 6:
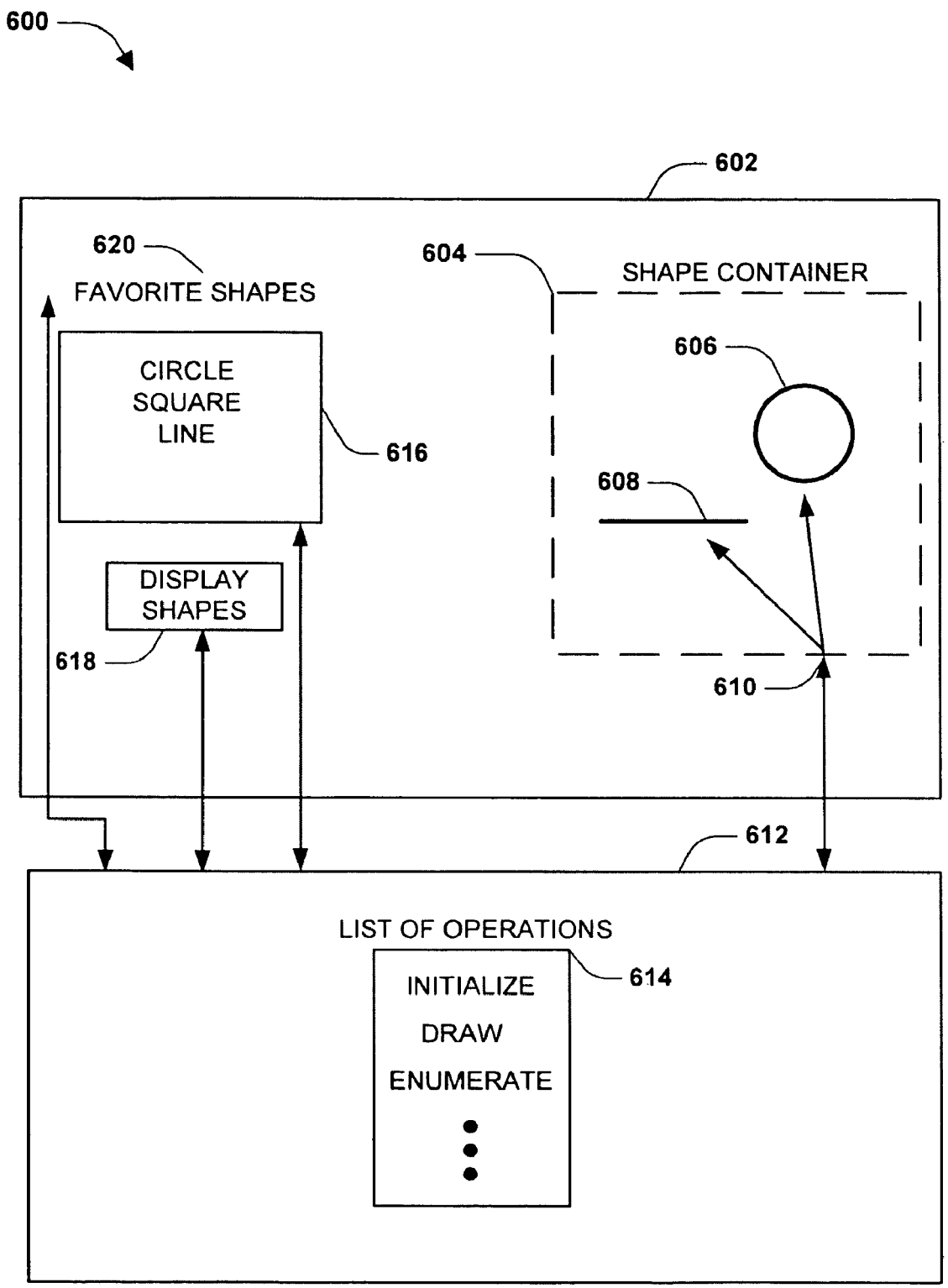
FIG. 6 is an illustration of an example of receiving an operation pertaining to at least one windowless shape and invoking a shape container to execute the operation on at least one windowless shape during runtime.

FIG. 6 illustrates an example 600 of receiving an operation pertaining to at least one windowless shape and invoking a shape container 604 to execute the operation on at least one windowless shape during runtime. A windows form 602 (e.g. a form) is presented during run me. The windows form 602 comprises controls (a favorite shapes label 620, a list box of shapes 616, and a display shapes button 618) and windowless shapes (a line windowless shape 608 and a circle windowless shape 606) comprised within the shape container 604.

The windows form 602 may be hosted (e.g. executed as a runtime) through a computing environment (e.g. operating system, application platform, web browser, etc.). Within the computing environment, a windows message loop 612 may be implemented. The windows message loop 612 comprises a list of operations 614 (e.g. a stack, data structure in memory, etc.) used to provide operations to the windows form 602, components, and/or other runtimes. The list of operations 614 may comprise operations used to pass data and/or instructions to the windows form 602 and/or components (controls) comprised within.

The list of operations 614 is maintained by adding new operations and/or removing received operations. New operations may be added to the list of operations 614 based upon user input (e.g. mouse click, etc.), messages from another application, and/or messages from the computing environment. A message may comprise an instruction, operation, and/or event pertaining to a form and/or component within the form. Operations may be removed from the list of operations 614 as the message comprising the operation is retrieved.

The controls (the favorite shapes label 620, the list box of shapes 616, and the display shapes button 618) may comprise one or more windows handle, allowing the controls to participate within the windows message loop 612. For example, a user interacting with the windows form 602 may use a mouse click to invoke the display shapes button 618. Clicking the display shapes button 618 initiates a mouse click event (e.g. operation) that is added into the list of operations 614 within the windows message loop 612. The windows handle of the display shapes button 618 may continuously and/or periodically "listen" for messages (operations) within the windows message loop 612 that pertain to the display shapes button 618. When the display shapes button 618 receives the mouse click event, the display shapes button 618 executes the operations corresponding to the mouse click event.

The favorite shapes label 620 and the list box of shapes 616 may also comprise windows handles that listen to the windows message loop 612 for operations pertaining to them. Computation resources are consumed when objects, controls, and/or forms participate within the windows message loop 612. The shape container 604 participates in the windows message loop 612, listening for messages (operations) pertaining to the windowless shapes (the line windowless shape 608 and the circle windowless shape 606) comprised within the shape container 604. Computing resources are mitigated because the windowless shapes (the line windowless shape 608 and the circle windowless shape 606), whose count may be more numerous than the one shape container, do not consume resources for participating in the windows message loop 612. Instead, the shape container 604 is configured to receive operations on behalf of the windowless shapes and then execute the operations.

The shape container 604 provides listening functionality 610, wherein the shape container 604 participates within the windows message loop 612. When the list of operations 614 comprises an operation for a windowless shape comprised within the shape container 604, the shape container will receive the operation pertaining to the windowless shape and execute the operation on the windowless shape. For example, a computing environment may facilitate the windows form 602. A user may select a line and a circle as their favorite shape from the list box of shapes 616. The user may then mouse click the display shapes button 618. Based upon the user selected line and circle, an operation may be added into the list of operations that instructs the line windowless shape 608 and/or the circle windowless shape 606 to be drawn on the windows form (e.g. presenting to the user their favorite shapes).

The shape container 604, through the listen functionality 610, may detect the draw operations pertaining to windowless shapes (the line windowless shape 608 and the circle windowless shape 606). The shape container 604 may relay the draw operations to the line windowless shape 608 and/or the circle windowless shape 606, may instruct the line windowless shape 608 and/or the circle windowless shape 606 to perform the draw operation, and/or may perform the draw instruction by drawing the line windowless shape 608 and/or the circle windowless shape 606 on the windows form 602.

Figure 7:
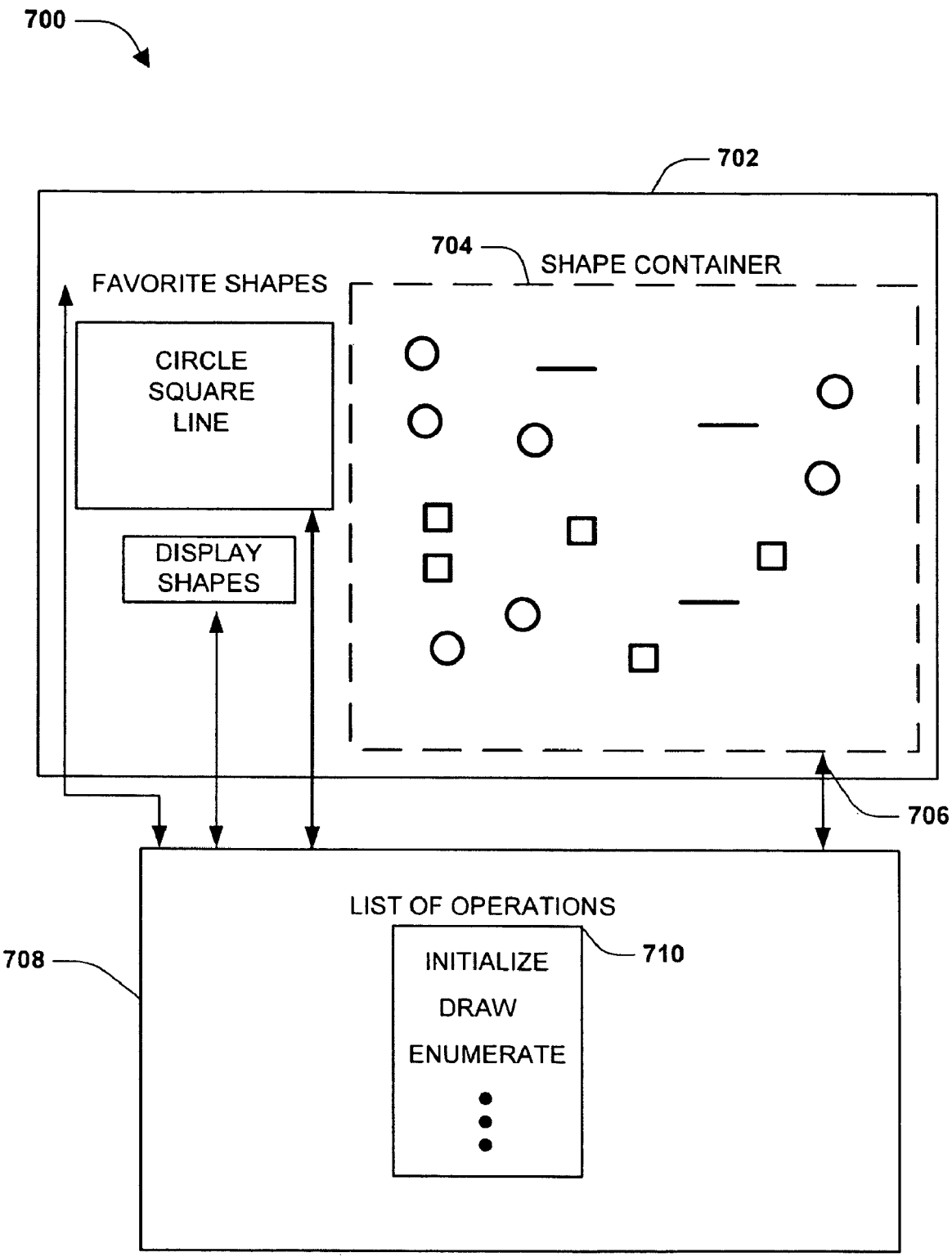
FIG. 7 is an illustration of an example of receiving an operation pertaining to at least one windowless shape and invoking a shape container to execute the operation on at least one windowless shape during runtime.

FIG. 7 illustrates an example 700 of receiving an operation pertaining to at least one windowless shape and invoking a shape container 704 to execute the operation on at least one windowless shape during runtime. The example 700 illustrates a windows form 702 at runtime that comprises the shape container 704 (with windowless shapes comprised within) and controls (e.g. label, list box, button). The shape container 704 provides a listen functionality 706, wherein the shape container 704 participates in a windows message loop 708 by listening to (checking on) a list of operations 710 for an operation pertaining to one or more windowless shapes.

The windows form 704 comprises a large number of windowless shapes. If the windowless shapes participated within the windows message loop 708, then an extensive amount of computer resources may be consumed by the drawing object (windowless shape). Instead, the drawing objects are drawn as windowless shape within the shape container 704. The shape container 704 is configured to listen through the listen functionality 706 for operations pertaining to windowless shapes. The shape container 704 receives an operation and executes the operation upon one or more windowless shapes.

Figure 8:
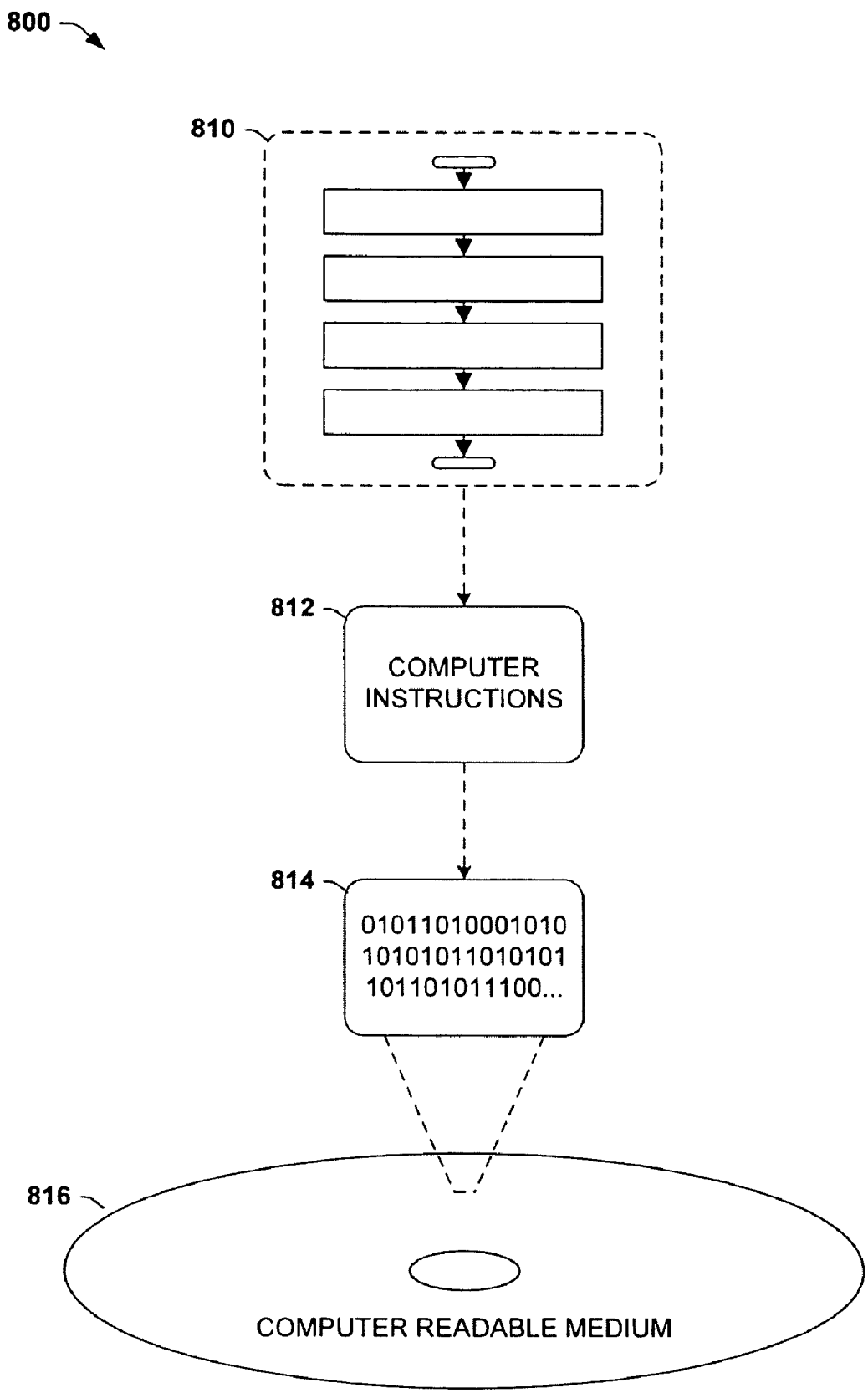
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 810. This computer-readable data 810 in turn comprises a set of computer instructions 812 configured to operate according to one or more of the principles set forth herein. In one such embodiment 800, the processor-executable instructions 814 may be configured to perform a method, such as the exemplary method 100 of FIG. 1, for example. In another such embodiment, the processor-executable instructions 814 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
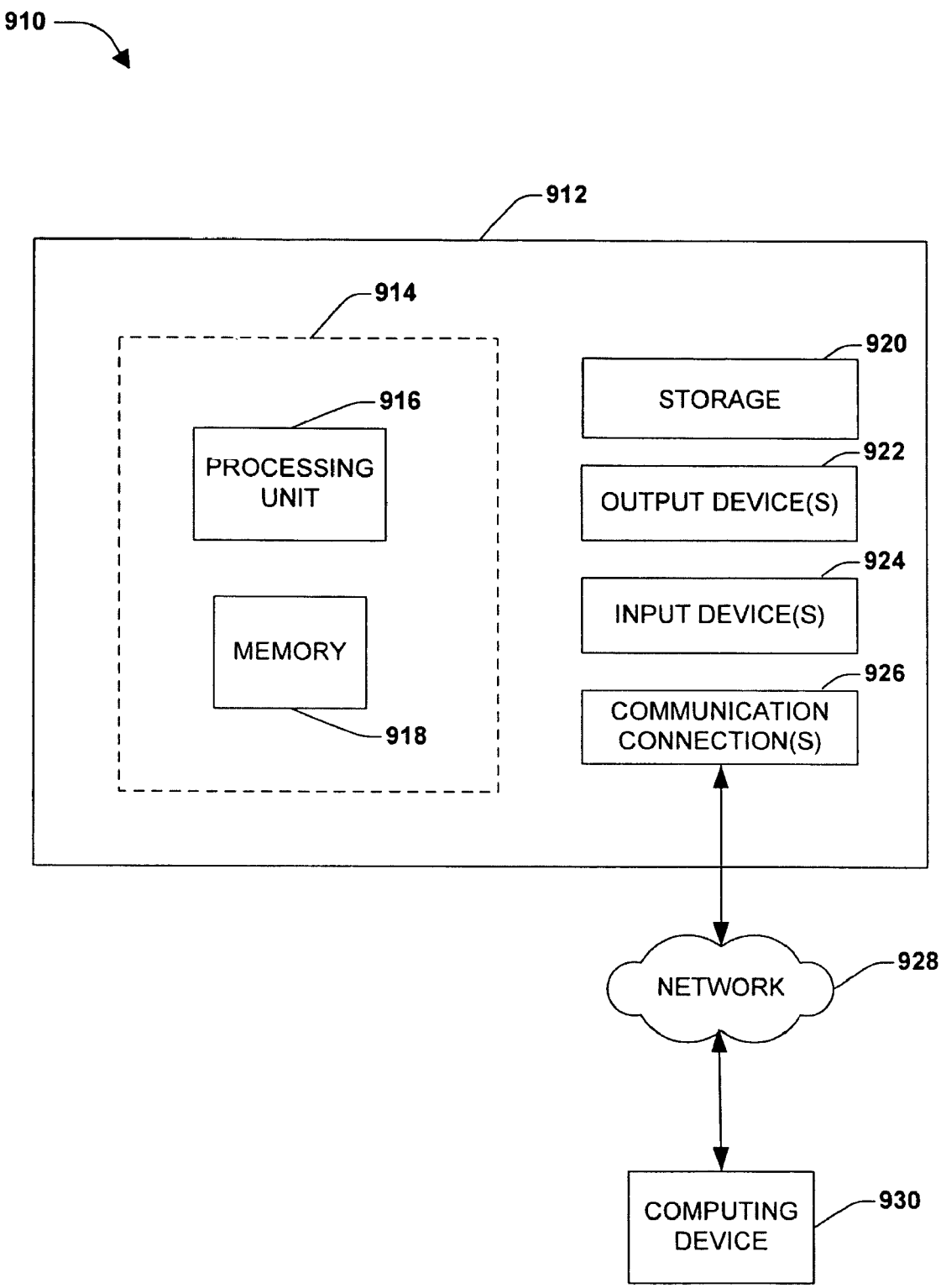
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of drawing a drawing object in a graphical region, comprising:
   receiving a drawing object to be placed onto a form;
   drawing the drawing object in a shape container within the form as a windowless shape, the windowless shape configured to not participate in a windows message loop at runtime, the drawing object configured to be dragged and dropped from a design environment to the form, the shape container configured to participate in the windows message loop on behalf of the windowless shape;
   creating the shape container within the form in response to placement of a first drawing object onto the form; and
   invoking the shape container to execute an operation received through the windows message loop on the windowless shape.

2. The method of claim 1, the windowless shape not comprising an event handler.

3. The method of claim 1, comprising:
   receiving a second drawing object to be placed onto the form; and
   drawing the second drawing object in the shape container within the form as a second windowless shape.

4. The method of claim 1, comprising at least one of:
   drawing, by the shape container, at least one windowless shape onto the form during design time;
   drawing, by the shape container, at least one windowless shape onto the form during runtime;
   presenting, by the shape container, the shape container as invisible on the form during design time; and
   presenting, by the shape container, the shape container as invisible on the form during runtime.

5. The method of claim 1, comprising listing a box of shapes.

6. The method of claim 1, comprising:
   relaying, by the shape container, an event from the windows message loop to the windowless shape.

7. The method of claim 1, the operation comprising at least one of:
   instantiating the windowless shape;
   initializing the windowless shape;
   enumerating the windowless shape;
   describing the windowless shape;
   drawing the windowless shape in the form;
   altering the windowless shape;
   deinitializing the windowless shape; and
   disposing of the windowless shape.

8. The method of claim 1, the invoking the shape container to execute an operation comprising at least one of:
   executing the operation on the windowless shape; and
   instructing the windowless shape to execute the operation.

9. The method of claim 1, comprising:
   forming the shape container within the form at a bottom of a z-axis object ordering list.

10. The method of claim 1, comprising:
    removing the shape container from the form based upon a last windowless shape being removed from the shape container during design time.

11. The method of claim 1, comprising:
    receiving a manipulation request of the windowless shape within the shape container during design time; and
    applying the manipulation request to the windowless shape within the shape container.

12. The method of claim 11, the manipulation request comprising at least one of:
    a resizing object request;
    a reposition object request;
    a change object property request;
    a delete object request; and
    an alter object request.

13. A system for drawing a drawing object, comprising:
    a shape container configured to host a drawing object as a windowless shape within a form, the windowless shape configured to not participate in a windows message loop at runtime, the drawing object configured to be dragged and dropped from a design environment to the form, the shape container configured to participate in the windows message loop on behalf of the windowless shape and be created within the form in response to placement of a first drawing object onto the form.

14. The system of claim 13, the shape container configured to:
execute an operation received through the windows message loop on the windowless shape.

15. The system of claim 13, the windowless shape not comprising an event handler.

16. The system of claim 13, comprising:
a shape container component configured to perform at least one of:
create the shape container within the form in response to placement of the first drawing object onto the form; and
remove the shape container from the form in response to removal of a last windowless shape from the form.

17. The system of claim 16, the shape container component comprising:
a drawing component configured to draw the windowless shape within the shape container.

18. The system of claim 17, the drawing component configured to perform at least one of:
draw the windowless shape within the shape container onto the form during design time; and
draw the windowless shape within the shape container onto the form during runtime.

19. The system of claim 16, the shape container component comprising:
a drawing interaction component configured to:
receive a manipulation request with regard to the windowless shape; and
apply the manipulation request to the windowless shape within the shape container.

20. A computer storage media comprising computer executable instructions that when executed via a processor on a computer perform a method for drawing a drawing object in a graphical region, comprising:
receiving a drawing object to be placed onto a form;
drawing the drawing object in a shape container within the form as a windowless shape, the windowless shape configured to not participate in a windows message loop at runtime, the drawing object configured to be dragged and dropped from a design environment to the form, the shape container configured to participate in the windows message loop on behalf of the windowless shape;
creating the shape container within the form in response to placement of a first drawing object onto the form; and
invoking the shape container to execute an operation received through the windows message loop on the windowless shape.

* * * * *